US011422117B2

(12) United States Patent
Halle et al.

(10) Patent No.: US 11,422,117 B2
(45) Date of Patent: Aug. 23, 2022

(54) COMBINED UV/VIS-ABSORPTION AND CONDUCTIVITY FLOW CELL FOR LIQUID CHROMATOGRAPHY

(71) Applicant: KNAUER Wissenschaftliche Geräte GmbH, Berlin (DE)

(72) Inventors: Detlef Halle, Teltow (DE); Michael Melnykov, Bernau (DE); Karl Zenichowski, Potsdam (DE)

(73) Assignee: KNAUER Wissenschaftliche Geräte GmbH, Berlin (DE)

( * ) Notice: Subject to any disclaimer, the term of this patent is extended or adjusted under 35 U.S.C. 154(b) by 295 days.

(21) Appl. No.: 16/557,327

(22) Filed: Aug. 30, 2019

(65) Prior Publication Data

US 2020/0072803 A1 Mar. 5, 2020

(30) Foreign Application Priority Data

Aug. 30, 2018 (DE) .......................... 102018121193.7

(51) Int. Cl.
*G01N 30/74* (2006.01)
*G01N 30/64* (2006.01)
*G01N 30/02* (2006.01)

(52) U.S. Cl.
CPC ............. *G01N 30/74* (2013.01); *G01N 30/64* (2013.01); *G01N 2030/027* (2013.01); *G01N 2030/645* (2013.01); *G01N 2030/746* (2013.01)

(58) Field of Classification Search
CPC ............. G01N 30/74; G01N 2030/743; G01N 2030/746; G01N 30/64; G01N 2030/027; G01N 2030/645
See application file for complete search history.

(56) References Cited

U.S. PATENT DOCUMENTS

| 4,462,962 A * | 7/1984 | Baba ...................... G01N 30/64 210/198.2 |
| 4,555,936 A * | 12/1985 | Scott ...................... G01N 30/64 356/417 |
| 4,886,356 A * | 12/1989 | Paradis .................. G01N 21/05 356/246 |

(Continued)

FOREIGN PATENT DOCUMENTS

JP 2011090797 A * 5/2011

*Primary Examiner* — Justin N Olamit
(74) *Attorney, Agent, or Firm* — Wolf, Greenfield & Sacks, P.C.

(57) ABSTRACT

A flow cell for a detector in a liquid chromatography system includes a flow cell body, an inlet, an outlet, at least two windows situated on opposing sides of the flow cell body, which are transparent for light, and at least two electrodes configured for a conductivity measurement. A detection channel is formed within said flow cell body, fluidly connecting said inlet and outlet, includes an optical path situated in between said two windows such that a light absorption measurement may be performed for a liquid passing through the detection channel, and a conductivity path formed by at least partially drilling through said electrodes to allow for a physical contact of a liquid passing through the detection channel. A detector or liquid chromatography system including such a flow cell as well as uses of the flow cell, detector or liquid chromatography system are also described.

21 Claims, 3 Drawing Sheets

(56) References Cited

U.S. PATENT DOCUMENTS

| | | | | |
|---|---|---|---|---|
| 6,144,447 | A * | 11/2000 | Ohman | G01N 21/05 |
| | | | | 356/246 |
| 9,194,848 | B2 * | 11/2015 | DeMarco | H05B 45/10 |
| 9,575,087 | B2 * | 2/2017 | Schick | G01N 37/00 |
| 10,833,676 | B2 * | 11/2020 | Hieltscher | E05F 15/73 |

* cited by examiner

COMBINED UV/VIS-ABSORPTION AND CONDUCTIVITY FLOW CELL FOR LIQUID CHROMATOGRAPHY

CROSS-REFERENCE TO RELATED APPLICATIONS

This application claims the benefit under 35 U.S.C. § 119 to German patent application DE 10 2018 121 193.7, filed on Aug. 30, 2018, the disclosure of which is hereby incorporated herein by reference.

FIELD

Aspects disclosed herein relate to a flow cell for a detector in a liquid chromatography system.

BACKGROUND

High performance liquid chromatography (HPLC) and fast protein liquid chromatography (FPLC) are techniques in analytical and preparative chemistry for separation, identification and quantification of solute/analyte mixtures dissolved in a liquid/eluent stream.

A typical liquid chromatography system includes the following parts: an eluent reservoir, a valve for solvent selection, a pump for eluent delivery, a valve or sample loop for sample injection, a column for analyte separation and/or purification, one or more detectors for characterizing the elute and/or detecting an analyte and a fraction collector for purification tasks.

For identification and quantification, a wide range of detection techniques (and detectors) have been established. A HPLC/FPLC detector usually consists of a sensor part, measuring a physical quantity, and supporting electronics. While the former applies the physical measurement principle on an analyte within or extracted from the eluent, the latter is responsible for recording and processing the sensor signals.

The measurement of UV/Vis light absorption is well established within HPLC and FPLC. Especially in FPLC UV/VIS detection is very often combined with the measurement of the electrical conductivity to control method parameters of the separation. In a wider application range, both techniques are generally of interest for the analysis of UV/Vis-transparent and/or electrically conductive liquids (e.g. chemical or biological process monitoring, water analysis or medical applications).

For UV/Vis absorption measurements, the intensity of light at a predefined set of wavelengths or wavelength ranges is recorded before and after its passage through the eluent. The preparation of a light illuminated eluent volume is usually achieved by means of a flow cell. A UV/Vis flow cell usually consists of a liquid inlet, an intermediate liquid passage and a liquid outlet. Light is coupled into and out of a certain liquid volume by means of optical transparent materials which themselves are sealed against the liquid. The change in UV/VIS absorption signals coincides with the concentration changes of the light-absorbing analytes.

Conductivity measurements of liquids can be performed via contacting and non-contacting techniques. For contacting conductivity measurements, the electrical resistance between at least two electrodes contacting the liquid is measured. The electrodes are made from a conducting material and are electrically insulated from each other. A typical flow cell for contacting conductivity measurements consist of a liquid inlet, an intermediate liquid passage including the contacting electrodes, means for measuring the eluent temperature and a liquid outlet. The temperature of the conducting liquid may allow for a temperature compensation of the temperature dependent conductivity value.

A conductivity flow cell for contacting conductivity measurements is characterized by its cell constant. The latter is defined as the ratio between effective distance and effective surface area of the conducting part of the electrodes in contact with the eluent, and may be determined or calibrated for each flow cell. The cell constant may be used for the recalculation of liquid conductivity from the measurable conductance.

A state-of-the-art contacting conductivity flow cell for FPLC/HPLC consists of a central insulator and two eluent-contacting electrodes pressed against or screwed into the insulator, while the whole assembly is permeated by a central eluent-passing channel. In another implementation the flow cell consists of up to four eluent-contacting electrodes separated by insulating material. The conducting electrodes might also be immobilized on the surface of an insulating carrier (e.g. via printing/sputtering ore etching techniques) with various geometrical patterns (e.g. encircling rings or interlinking comb structures). Also known are flow cells with conducting electrode pins pointing into the liquid.

In state of the art FPLC systems UV/VIS absorption and conductivity measurements are carried out via two separate detection devices using separate flow cells. Both devices might be integrated in a common housing or are utilized as separate stand-alone devices.

A typical FPLC system setup incorporates both detectors, providing means for UV/Vis-absorption measurement and conductivity monitoring, therefore. Usually, a UV/VIS detector (e.g. KNAUER UVD 2.1S) and a conductivity detector (e.g. KNAUER CM2.1S) are arranged in a linear eluent flow path. Optionally, an additional flow cell for pH-measurement might be added after the conductivity detector.

In the prior art some attempts have been described for providing detectors with multiple functions.

For instance, US 2016/0077067 A1 discloses a flow cell for liquid chromatography that allows both conductivity and absorption to be measured. For this purpose, the flow cell comprises two module bodies, each comprising an optical path for carrying out a UV/VIS absorption measurement. The two module bodies are either made of conductive material or comprise conductive discs, which are separated by insulators, so that the module bodies act as electrodes. The described setup is not suitable for a single-channel UV-Vis absorbance measurement, due to its complexity and related costs. Connecting the modules and connected manifold of sealing surfaces may be tedious and result in error, as for example an increased probability of leakages, cross contaminations and trapped gas bubbles. Furthermore, conductivity is measured in US 2016/0077067 by means of electrodes which are stacked on top of each other and separated from each other by insulation, which may lead to less reproducible measurements. The latter is caused by the fact of a drifting electrode distance and related conductivity cell constant, due to the inherent flexibility of typically utilized chemically inert and insulating sealing materials, such as Fluoropolymers.

CN104062366A proposes a multiparameter flow cell for liquid chromatography to perform a combined measurement of conductivity, temperature, pH or UV absorption. The flow cell has a to-be-tested liquid path on which various electrodes and quartz plates may be arranged as windows for UV absorption measurement. The assembly is however laborious. Moreover, to fit the absorption measurement, the electrodes are a spaced apart considerably, which may lead to erroneous conductivity measurements.

Both attempts (US 2016/0077067 and CN104062366A) result in an elongated path length and corresponding dwell volume, as compared to the invention described in the following. An increased dwell time lowers the chromatographic resolution and sensitivity by broadening of analyte peaks. An elongated eluent dwell time is also likely to increase the eluent temperature, due to the excess heat of typically utilized light sources, such as Deuterium- or Halogen lamps, transferred via the body of the optical bench and their typically optically tight and spatially closed arrangements. Eluent heating is generally not desirable for typical biological macromolecular samples as analyzed in biological chromatography applications, for example.

SUMMARY

In one embodiment, a flow cell for a detector in a liquid chromatography system is provided. The flow cell includes a flow cell body, an inlet port, an outlet port, and at least two windows situated on opposing sides of the flow cell body. The at least two windows are transparent to light. At least two electrodes are configured for a conductivity measurement. The flow cell includes a detection channel formed within the flow cell body. The detection channel fluidly connects the inlet and outlet ports. The detection channel includes an optical path situated in between the at least two windows such that a light absorption measurement may be performed for a liquid passing through the detection channel. A conductivity path is situated in between the at least two electrodes formed by at least partially drilling through the at least two electrodes to allow for a physical contact of the liquid passing through the detection channel.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

The inventors have come to appreciate that prior systems take up considerable space on a lab bench. Furthermore, the inventors have appreciated that the need of additional tubing for connecting the different detectors may increase the risk of leakage, increase unfavorable dwell volume (increasing peak broadening thereby decreasing peak resolution by dilution and remixing of formerly separated analytes) as well as back pressure between the separating column and detector. If the inner diameter of the liquid flow channel of a chromatographic systems needs to be adapted in order to find the optimal ratio between back pressure (decreasing with inner diameter) and dwell volume (increasing with inner diameter) for a given flow rate, the inventors have discovered that it may be more convenient to change only one flow cell instead of two separate flow cells for conductivity and UV/Vis absorbance measurements. In particular conductivity flow cells in state-of-the-art systems are rarely changeable, often requiring a compromise of back pressure and flow rate as well as restricting the system to a certain flow rate range.

Aspects of the present disclosure is the provision of improved or alternative means for providing a flow cell for a detector in a liquid chromatography system that is compact, less error prone and allows for increased measurement accuracy.

Aspects disclosed here therefore relate to a flow cell that is characterized by the provision of means for an optical absorption measurement as well as conductivity measurement in a single device. Thereby the flow cell allows for a particular compact design and reduces the volume of a liquid chromatography system on the lab bench. Another benefit relates to the reduction of costs for production, development and service by the integration of both principles, namely measuring absorption and conductivity in a single flow cell. Production costs include for example general logistics, assembly and testing. Development costs include for example construction and design, hardware- and software development. By providing a flow cell for a combined detection of absorption and conductivity measurements each of the cost factors can be significantly reduced.

Furthermore, the described embodiment of a flow cell for a combined light absorbance and conductivity measurement is particular beneficial in terms of temperate control of thermally sensitive samples. For instance, commonly utilized spectral broadband sources for optical HPLC detectors, such as Deuterium- or Tungsten-lamps, generate significant amounts of exhaust heat (usually over 10 Watts). In state-of-the-art absorbance detectors for chromatographic purposes the compact optical bench design usually allows for heat transfer between lamps and flow cell to some extent warming up the eluent, passing the optical flow cell, by several degree Celsius at low flow rates (below 1 ml/min). Native state structures of heat-sensitive biopolymers like nucleic acids or proteins may be affected and monitoring of eluent-temperature within the optical flow cell, which is usually the section of the chromatographic eluent flow path with the most elevated temperature, is therefore desirable.

Moreover, the accuracy of an eluent conductivity measurement depends on an accurate measurement of eluent temperature. Therefore, the described embodiment of a combined absorbance and conductivity flow cell may, in some embodiments, provide additional means for an eluent temperature measurement. In one embodiment, the compact flow cell design and proximity of optical detection path and conductivity detection path provides a homogeneous temperature for both segments of the flow cell body and thus the means for a particularly accurate monitoring of the eluent temperature. In comparison, prior art approaches using separate flow cell entities for absorbance and conductivity measurement usually only report the temperature of the eluent in the cooler conductivity flow cell. The temperature in the typically warmer absorbance flow cell is not known and can therefore not be taken into account when interpreting the data.

In some embodiments, the flow cell is characterized by a single detection channel that fluidly connects the inlet and outlet of the flow cell. In comparison to prior art approaches for combining different measurement detection schemes in a liquid chromatography system, additional tubing or connectors can be avoided. Such a design not only increases leakage safety, but also reduces chromatographically unfavorable dwell volume. As such, the remixing of formerly separated analytes, turbulences in the flow path, as well as back pressure between the separating column and the detector may all be avoided. Furthermore, using the flow cell described herein may reduce a time delay between absorption or conductivity measurement, which may further improve measurement quality.

The flow cell may thus convey a number of benefits for liquid chromatography systems. As used herein "liquid chromatography" relates to chromatographic techniques known in the art that are used to separate components of a mixture based on a particular characteristic of the components. Liquid chromatography may be used to identify and quantify the different components. In general, liquid chromatography involves a liquid sample being passed over a solid adsorbent material packed into a column using a flow of liquid solvent. Each component (e.g., analyte such as a protein or DNA) in the sample interacts slightly differently with the adsorbent material, thus retarding the flow of the analytes. If the interaction is weak, the analytes flow off the column in a short amount of time, and if the interaction is strong, then the analytes take a longer time to flow off the column.

The active component of the column, referred to as the sorbent, is typically a granular material made of solid particles (e.g., silica, polymers, etc.), and can range from approximately 2-50 micrometers in size. The components of the sample mixture are separated from each other due to their different degrees of interaction with the sorbent particles. The pressurized liquid is typically a mixture of different polar (e.g. water, acetonitrile or methanol) or apolar (e.g. cyclohexane, dioxane, dichloromethane) solvents and is referred to as a "mobile phase" or "eluent". The composition and temperature of the mobile phase liquid plays a major role in the separation process by influencing the interactions between sample components and the sorbent. These interactions are physical in nature, such as hydrophobic (dispersive), dipole-dipole and ionic, or some combination thereof.

The sample mixture to be separated and analyzed is introduced, in a discrete small volume (typically microliters), into the stream of mobile phase percolating through the column. The components of the sample move through the column at different velocities, which are functions of specific physical interactions with the sorbent (also called stationary phase). The velocity of each component depends on its chemical nature, on the nature of the stationary phase (column) and on the composition of the mobile phase. The time at which a specific analyte emerges from the column is referred to as its "retention time". The retention time measured under particular conditions is considered an identifying characteristic of a given analyte.

A liquid chromatography system generally includes a sampler (or sample injector), pumps, one or more columns, and a detector. The sampler brings the sample mixture into the mobile phase stream which carries it into the column. The pumps deliver the desired flow and composition of the mobile phase liquid through the column. The detector typically generates a signal proportional to the amount of sample component emerging out of the column, thus allowing for quantitative analysis of the sample components. Furthermore, valves can be incorporated at different positions in the flow path scheme and for different purposes within a chromatography system (e.g. buffer or eluent selection before the pump, sample injection after the pump and before the column, column selection before and after a set of columns and after the column for detector selection and/or fractioning of the eluent flow). Various variations of liquid chromatography and suited systems are known in the prior art including for instance high performance liquid chromatography (HPLC) or fast protein liquid chromatography (FPLC).

The term "flow cell" as used herein, refers to a cell, such as a detection cell, configured to allow a sample or fluid to flow through the cell so as to allow continuous exchange of the sample within the cell during operation of the cell (such as during detection) and to allow for a continuous analysis of an eluent that is proceeding through a flow path. The flow cell refers in some embodiments to a component installable into the detector of a liquid chromatography system including at least an inlet for receiving an eluent, an outlet outputting the eluent and a detection channel in between allowing for analyzing components within the liquid.

As used herein the term "detection channel" refers to a channel in between said inlet and outlet ports of the flow cell. A "channel," as used herein means in some embodiments a feature within a flow cell body that at least partially directs flow of a fluid. The channel can have any cross-sectional shape (circular, oval, triangular, irregular, square or rectangular, or the like), but may exhibit a circular cross-sectional shape in some embodiments. In some embodiments, the detection channel is completely enclosed along its entire length with the exception of the inlet and the outlet opening. A channel may also have an aspect ratio (length to average cross sectional dimension) of at least 2:1, more typically at least 3:1, 5:1, 10:1, 15:1, 20:1, or more.

In one embodiment, the detection channel is formed as a single, continuous channel within the flow cell body. In some embodiments, the flow cell body refers to the main body of the flow cell. The flow cell body may be monolithic as opposed to comprising separate components or modules that are connectable by connecting means to form a flow cell body.

It one embodiment, the detection channel is a single channel formed by either a single or a set of intersecting bores within said flow cell body fluidly connecting the inlet and outlet. As a continuous channel, the detection channel may not comprise any connection means for connecting separate parts or sections of a detection channel. Instead, sections of the detection channel that allow for absorption measurements (i.e. an optical path) as well as sections of the detection channel that allow for conductivity measurements (i.e. conductivity paths) are fluidly connected with no boundary or separate connection means.

The flow cell of the embodiments described herein provides for at least two types of measurements for analyzing physical properties of a liquid in a detector: light absorption and conductivity measurements. A temperature measurement may be included as an additional element to accompany a conductivity measurement.

As used herein "absorption measurement" or "light absorption measurement" relates to known measurement techniques in the art, wherein the absorbance of light within a passing liquid is measured for detecting the presence, and determining the concentration, of light absorbing analytes, such a chemical compounds, natural products, peptides, proteins, nucleic acids, DNA, small drug molecules, etc. To this end, radiation of a beam of light typically travels along an optical path in which the liquid passes and falls onto a light detector whose output is recorded by suitable instrumentation that is calibrated to indicate the amount of radiation absorbed by the fluid flowing through the flow cell.

The quantitative presence of a substance of interest may be determined by measuring the area under the graph peaks, which represent the amount of radiation of a particular wavelength that is absorbed.

In some embodiments, to allow for a light absorption measurement, the flow cell comprises two windows which allow for passing a light beam for the absorption measurement on the passing liquid and define the optical path. As used herein the "optical path" refers in some embodiments to the section of the detection channel, which is situated in between said two windows of the flow cell. As used herein the "window" refers in some embodiments to an opening (e.g. bore, channel, hole) within the flow cell body connecting the outer surface of the flow cell body with the detection channel described herein, covered by an optically transparent but liquid-tight material or stack of the same optically transparent elements (e.g. lenses, discs, plates, light-guides) of various geometric shapes (e.g. triangular, rectangular, spherical, cylindrical) which itself is sealed against the flow cell body to hinder the exit of pressurized liquids within the detection channel within the flow cell.

The length of the optical path, in one embodiment, s thus defined by the distance in between said two windows. Depending on the design choice for installing the windows in respect to the detection channel, different lengths for an optical path can be defined.

Figure 1:
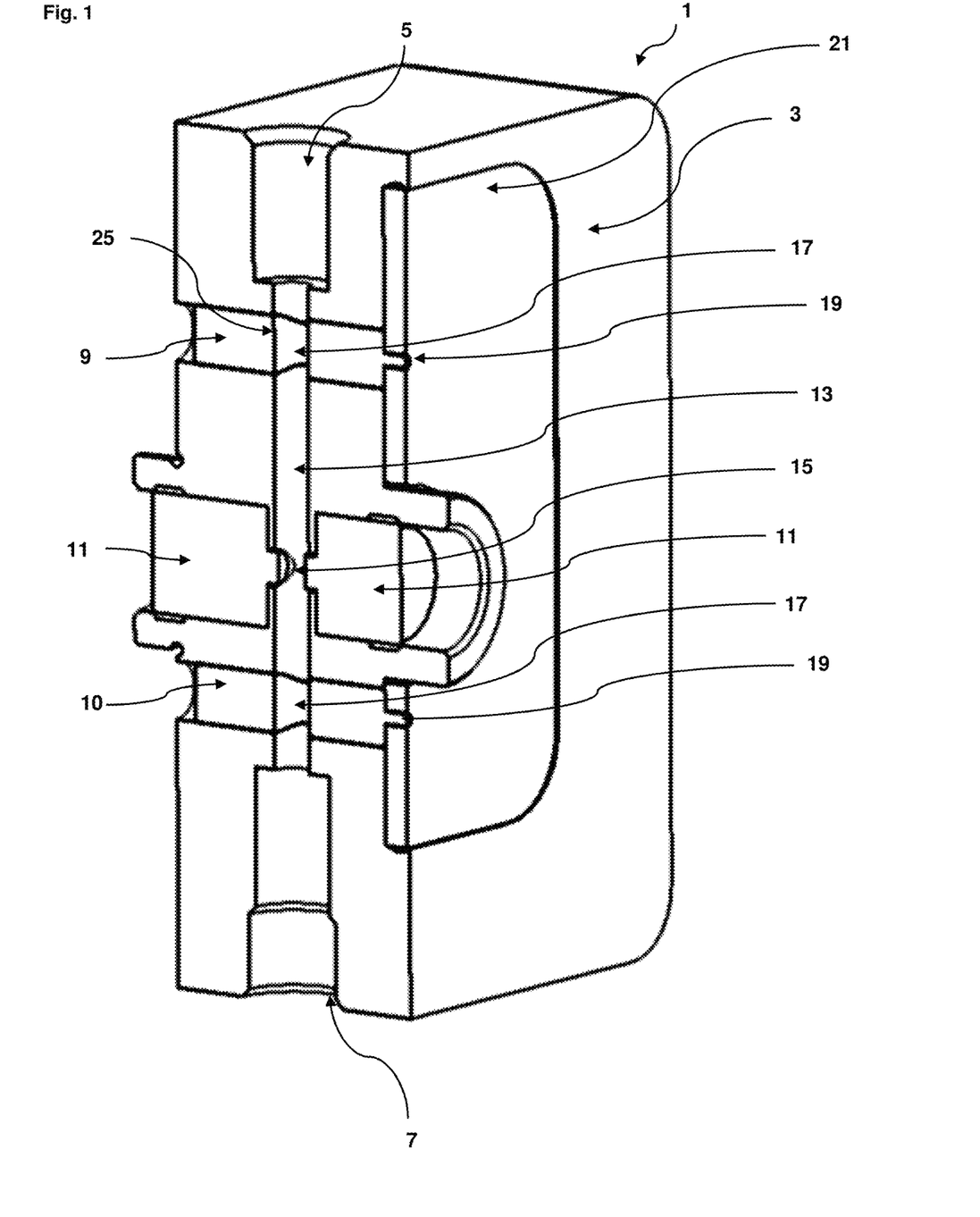
FIG. 1 is a schematic illustration of an embodiment of a flow cell allowing for an absorption and conductivity measurement.

For instance, in the case of a flow cell with a straight detection channel in between the inlet and the outlet, wherein the windows are placed laterally on opposing sides of the detection channel, the length of the optical path may essentially correspond to the cross-sectional width of the detection channel (see FIG. 1). In the case of a circular detection channel, the length of the optical path will thus essentially correspond to the diameter of the detection channel. Alternatively, for a detection channel with a Z-shape, wherein the windows are situated on opposition terminating ends of a middle section, the length of the optical channel may refer to the length of said middle section.

As used herein "conductivity measurement" refers to a measurement of the electrical conductivity of the liquid within a detection channel as known in the art. Electrolytic conductivity of a liquid solution is often related to the ionic concentration of a solution. In conjunction with light absorbance measurements, conductivity measurements provide additional information about the eluent or mobile phase, such as buffer, salt or analyte concentration. Conductivity (inverse electrical resistivity) may typically be determined by measuring the resistance (or current flow at a given voltage potential) across a set of at least two electrodes, which are separated by insulator material preventing electrical conduction between the electrodes other than through the liquid solution within the detection channel along the conductivity path.

Since conductivity may be measured by determining the amount of current that can be carried between said electrodes by the passing (electrically interconnecting) liquid, the ratio of the effective distance between the two electrodes and the electrode surface area effectively contributing to the current flow shall be known. Said ratio, which may inform a conductivity measurement, is known as the cell constant. The cell constant for a given electrode insulator setup is usually unknown and needs to be calibrated by a conductivity measurement of a standard with known conductivity. Therefore, the cell constant is typically a multiplier constant specific to a conductivity setup or path. In a conductivity measurement, the measured conductance or inverse resistance in between the electrodes is multiplied by the cell constant to determine the electrical conductivity of the solution which is defined as a physical property of the liquid which is independent of the individual cell constant of the utilized electrode insulator type or geometry. The cell constant, known as K, refers to a theoretical electrode pair consisting of an effective surface area of 1 $cm^2$ spaced 1 cm apart. A cell constant has units of 1/cm (per centimeter), where the number refers to the ratio of the distance between the electrode to the surface area of the electrodes.

To allow for a combined conductivity measurement, the flow cell as described herein comprises at least two electrodes, wherein a conductivity path is formed by at least partially drilling through said electrodes to allow for a physical contact of a liquid passing through the detection channel.

As used herein the term "conductivity path" relates to a section of the detection channel along which an electrical conduction within the liquid in between said two electrodes is determined. The ends of the conductivity path may be defined by sections of the detection channel in which the liquid passing through is in a physical contact with said electrodes. In other words, the conductivity path may be situated in between said two electrodes and may relate to a section of the detection channel, wherein at the beginning and end of the conductivity path boundaries of the detection channel are at least partially formed by said two electrodes.

The lengths of the conductivity path may be defined as the distance between the most distant two out of two or more electrodes. In one embodiment, the length of the conductivity path may be the length between the most upstream part of a first and most downstream part of a second electrode. In the case of three, four or more electrodes the length of the conductivity path relates to the total distance between the most upstream and most downstream electrode. As used herein in "upstream" refers to a direction within the detection channel towards the inlet, whereas downstream characterizes sections which are oriented towards the outlet of the detection channel.

In some embodiments, the flow cell is characterized in that a conductivity path is provided by at least partially drilling through said at least two electrodes. A person skilled in the art understands that thereby a structural feature of the flow cell is provided, which defines surface and boundary properties of the detection channel being at least partially formed by the remaining surface of electrodes. In other words, the flow cell comprises electrodes that are at least partially drilled through and which form part of the conductivity path as described herein.

By forming a conductivity path by at least partially drilling through said at least two electrodes, a reproducible smooth and closed surface along the border of the detection channel between insulating material (stemming from the flow cell body) and conducting material (stemming from the electrodes) may be provided. The incorporation of the electrodes into the detection channel thereby differs considerably from other approaches in the prior art, wherein electrodes protrude into the detection channel or the detection channel is composed of a stack of alternately electrical conducting and insulating elements (e.g. plates, discs, washers, fittings) or the detection channel is at least partly covered by an insulating support material, carrying conductive surface structures (e.g. metal layers on ceramics) to allow for a conductivity measurement.

Typically, the flow cell body is made of an insulating or non-conductive material, while the electrodes inserted into said flow cell body, e.g. as press fit pins, are made of a conductive material. By drilling through the flow cell body and at least partially through the electrodes, a detection channel is formed with a smooth and closed surface between an electrode surface and the surface of the flow cell body.

Contrary to prior art approaches, there may be no gaps between the insulating and conducting materials. The lack of any gap hinders air bubbles that may block parts of the conducting surface, thereby efficiently avoiding noise/falsification of the conductivity measurement, which may occur otherwise. In addition, the lack of possible gaps between insulating and conducting materials within the detection channel avoids biological and chemical cross-contamination and provides an easily cleanable flow cell.

Moreover, a reproducible and stable electrode distance, conducting surface and therefore a highly reproducible and long-term stable cell constant may be achieved, extending considerably the time span between recalibration measurements of the cell constant. This contrasts with a pressed or screwed stack of electrodes and soft insulator or sealing materials, such as fluorinated polymers, where a net force of a passing liquid can cause an unreproducible short and long-term deformation, which alters the cell constant and thus the conductivity measurement.

In this regard the inherent tightness between electrode and insulator (i.e. the flow cell body) abolishes the need of additional sealing means, which facilitate the production, reduces the number of wetted materials (which usually have to fulfill certain compliance and conformity regulations, especially within the scope of life science, pharmaceutical and medical applications (e.g. FDA approval)), and reduces error-prone components of the system.

In one embodiment, the provision of forming the conductivity path by at least partially drilling through the electrodes may improve the hydrodynamics of the flow cell. Since, contrary to prior art approaches, no pin or channel constriction of, for sealing purposes compressed, flexible polymer material or steps arising from alignment tolerances of insulator-conductor stack arrangements or other parts of an electrode are pointing into the liquid flow path, turbulence or an increased back pressure for the liquid flow are avoided. Instead the diameter of the detection channel is unaltered over the entire conductivity path, allowing for a conductivity measurement in a liquid chromatography system with minimal interference of the liquid flow.

Furthermore, the possibility of mechanical processing of intermediate insulator-conductor assembly ensures precise creation and positioning of mechanical elements needed for electrical contacting the electrodes.

Also, much smaller port to port (i.e. inlet to outlet) dwell volume are achievable, as compared to measuring rod electrodes which require additional sealing. For instance, dwell volumes of several µl can be realized for a setup with an optical path length of 5 mm (see FIG. 2).

Moreover, by providing means for conductivity measurements by partially drilling through the electrodes allows for a particular straight forward, simple and robust implementation of three or more electrodes.

For instance, in leakage-current resistant 3-electrode or a polarization resistant 4-electrode can be built with much less technical effort and low dwell volume compared to pressed stack of insulators and conductors.

As used herein the terms "partially drilling through said electrodes" or "electrodes being partially drilled through" relate to a drilling that removes parts of the electrode material, wherein the remaining part of the electrode at least partially forms a boundary of the detection channel.

In some embodiments, partially drilling through said electrodes may relate to electrodes that are completely drilled through.

Herein, a section of the detection channel is completely formed by a surrounding surface of an electrode. To this end the diameter or cross-sectional section of the detection channel is smaller than the respective area of the electrodes, so that by drilling through the center of an electrode (for instance through the center of an electrode pin), an electrode ring surface is formed that provides a complete wetting of the electrode surface by the passing liquid.

By having an electrode that is completely drilled through to provide for a conductivity measurement, a liquid pressure may not act as a net force, since the pressure will be acting symmetrically on all sides of the drilled hole. Pressure resistances of 100 bar were achieved for such embodiments, making the embodiments particularly useful for HPLC/FLPC applications.

However, in other embodiments, partially drilling through said electrodes may also relate to electrodes which have be drilled through at one of their terminating ends wherein material of the electrodes has been removed by drilling aside or below the electrode. Likewise, in other embodiments, partially drilling through said electrodes may relate to electrodes which have been laterally drilled through in sections between their terminating ends.

For instance, in some embodiments, the electrodes may be provided as (press-fit) pins which are inserted into a flow cell body from one side. A detection channel may be formed by drilling through the flow cell body, but only partially drilling through an end section of the electrode, hence drilling aside or drilling through a part of the terminating end or an electrode side in a brushing or touching manner. Likewise, a detection channel may be formed by drilling through the flow cell body, but only partially drilling through a lateral section in between the terminating ends of an electrode in a brushing, streaking or touching manner.

Such an embodiment is particularly useful for applications in a liquid chromatography system, wherein larger diameters of the detection channel are desired to allow for higher flow rates of the eluent.

By only partially drilling through an end portion of the electrode or a lateral drilling aside the electrode pin within a section between electrode ends (in contrast to completely drilling through an electrode), the diameter of the electrode may not have to grow with the diameter of the detection channel.

This means that the surface of the electrode in contact with the liquid can be kept constant, while the diameter of the detection channel may be increased to a desired dimension.

In regard to the conductivity measurement, the exchange of electrical charges will take place over said wetted surface of the electrode. Accordingly, the surface area influences the cell constant which is required to calculate the specific conductivity and relates to the distance of the electrodes divided by their wetted area. In this embodiment the cell constant can thus also be reserved for larger channel diameters in a desired range, which can be optimized for downstream readout electronics.

For an embodiment in which the electrodes are only drilled partially at an end section or laterally in a section between electrode ends, the channel diameter and thus the maximal eluent flow rate is not restricted. Instead the diameter of the detection channel may be increased, while at the same time, the electrode distance versus surface ratio (defined as cell constant) is preserved within useful limits, allowing for compact flow cell design at any desired flow rate. For classical stack arrangements in the prior art, the conducting electrode would cover the entire inner diameter and increase the electrode surface. An increase of electrode distance would thus be required to keep the cell constant at an optimal range, which in turn would necessitate larger flow cells.

In one embodiment, the flow cell is characterized in that the two windows are transparent for ultraviolet light, visible light and/or infrared light.

As used herein the term "ultraviolet light" or "UV" refers to electromagnetic radiation with a wavelength of 100 to 380 nm. In some embodiments, the term "ultraviolet light" or "UV" refers to electromagnetic radiation with a wavelength of 180 nm to 380 nm.

As used herein the term "visible light" or "VIS" refers to electromagnetic radiation with a wavelength of 380 nm to 780 nm.

As used herein the term "infrared light" or "IR" refers to electromagnetic radiation with a wavelength of 780 nm to 1400 nm (near infrared light, NIR). In some embodiments, the term "infrared light" or "IR" refers to electromagnetic radiation with a wavelength of 780 nm to 1000 nm.

In some embodiments, the flow cell is thus characterized in that the two windows are transparent for electromagnetic radiation with a wavelength of 100 nm to 1400 nm. In some embodiments, the flow cell is characterized in that the two windows are transparent for electromagnetic radiation with a wavelength of 180 nm to 1400 nm. In some embodiments, the flow cell is thus characterized in that the two windows are transparent for electromagnetic radiation with a wavelength of 180 nm to 1000 nm.

However, in some embodiments, the windows are specifically adapted for a transmission of electromagnetic radiation in a UV range (e.g. 180 nm to 380 nm), a visible range (e.g. 380 nm to 780 nm) or infrared range (e.g. 780 nm to 100 nm).

As used herein "transparent" means that the windows allow for a significant transmission of an electromagnetic radiation at the respective wavelength. For example, transparent means a transmittance (fraction of electromagnetic radiation transmitted through the window, typically measured at a perpendicular incidence) of at least 50%, at least 60%, at least 70%, at least 80% or more.

In some embodiments, the windows are made of quartz-glasses.

In some embodiments, the windows exhibit a width of 1 mm to 10 mm.

In some embodiments, windows being transparent for UV, VIS and/or IR light may be used for applications in which an absorption measurement at the respective wavelength is desired. A person skilled in the art may thus choose certain properties of the windows to optimize the flow cell in dependence of the absorption characteristics to determine analyte concentrations.

In a further embodiment, the detection channel exhibits a rectilinear section connecting the inlet and outlet ports. The embodiment can also be referred to as a straight (line) detection channel. In some embodiments, the two windows for the absorption measurement are situated on lateral sides in direct contact with the detection channel, such that the optical path is oriented perpendicular to the liquid flow and exhibits a width which corresponds to the cross-sectional dimension of the detection channel (e.g. the diameter, see FIG. 1).

In some embodiments, the diameter of the detection channel and thus the optical path may be in the range of 0.1 mm to 10 mm. In other embodiments, the diameter of the detection channel and thus the optical path may be in the range of 0.5 mm to 5 mm. In some embodiments, the diameter of the detection channel and thus the optical path may be approximately 2 mm. Such ranges are particularly beneficial for an embodiment in which the detection channel exhibits a rectilinear shape connecting the inlet and outlet. Herein, the length of the optical path may correspond to the width of the detection channel. However, via the utilization of light guides (optically transparent rods), with an outer diameter larger than 0.5 mm and a length larger than 2 mm, protruding into the detection channel, the optical pathlength can be smaller than the inner diameter of the detection channel. This is beneficial for the measurement of optically dense (strongly light absorbing) liquids at elevated flow rates, requiring larger channel diameters.

In some embodiments, the two electrodes for a conductivity measurement are arranged along the length of the detection channel, wherein both electrodes are arranged either upstream or downstream of the windows, so that the distance of the electrodes (and thus the cell constant) may be chosen independently. Moreover, in some embodiments the electrodes correspond to press fit pins, which are entirely drilled through to form the conductivity path as described herein. In some embodiments, the electrodes correspond to press fit pins that are partially drilled through at their end portion or laterally in a section between the end portions.

Said embodiment allows for a particular compact design of a flow cell allowing for an absorption and conductivity measurement in a single detector.

While the embodiment is particularly suited for applications in which a higher concentration of analyte is suspected favouring smaller optical paths for an absorption measurement, for other applications larger optical paths may be desired.

In some embodiments, the detection channel at least partially exhibits a Z-shape. Herein the Z-shape refers to a shape with three rectilinear sections, an upstream, a middle and a downstream section, wherein the middle section is oriented with an angle of in between 30° and 135°, between 30° and 90°, or between 45° and 90°, with respect to the upstream and downstream section.

In some embodiments, the detection channel thus exhibits at least three rectilinear sections: an upstream, a middle and a downstream section, wherein the middle section is oriented with an angle in the range of 30° to 135°, 30° to 90°, 45° to 90°, or 60° to 90° with respect to the upstream and downstream section and wherein the windows are situated on opposing ends of the middle section forming the optical path.

In some embodiments, the upstream section refers to the section of the detection channel between the inlet and the middle section, whereas the downstream section connects the middle section to the outlet port.

In some embodiments, the detection channel is bent in a Z-shape, wherein the middle section exhibits a different orientation compared to the upstream and downstream sections. This allows the placing of two windows at the respective ends of the middle sections, such that the length of the middle section defines the length of the optical path.

The middle section may encompass different angles compared to either one of the upstream or downstream sections. For instance, the middle section and the upstream section may exhibit an angle in the range of 45° to 90°, for instance in the range of 70° to 80°, while the middle section and the downstream section may exhibit the same or a different angle in the range of 45° to 90°, for instance approximately 90°. The bending and angles may be chosen depending on a desired positioning of the inlet and outlet ports for connecting the flow cell to the detector.

The embodiment allows for flexible design of desired optical path length by setting the length of the middle section, while maintaining a compact design of the flow cell.

In some embodiments, the length of the middle section and thus the optical path may be in the range of 1 mm to 20 mm, 2 mm to 10 mm, or approximately 5 mm.

Although the Z-shape introduces partial bending of the detection channel, especially for some angles, the interference with a liquid flow is negligible and does not introduce significant turbulence or back pressure. Instead the embodiment allows for a compact design of a flow cell with larger optical path lengths, which may be particularly desired for applications in which low concentrations of light absorbing analytes are to be detected.

In some embodiments, the electrodes for a conductivity measurement are arranged along the length of the upstream and/or downstream portion, wherein two electrodes are arranged on either one of the sections, so that the distance of the electrodes (and thus the cell constant) may be chosen independently of the length of the middle portion.

One embodiment of the flow cell thus provides means for highly sensitive absorptions as well as conductivity measurements in a particular cost and space efficient manner.

In some embodiments, the detection channel exhibits a path length in the range of 10 mm to 100 mm, 15 mm to 75 mm, or 25 to 45 mm. Herein, in some embodiments, the path length is defined as the total distance of the detection channel from the inlet port to the outlet port.

In some embodiments, the detection channel exhibits a total dwell volume within the range of 5 μl to 500 μl, 10 μm to 300 μl, or 20 μl to 150 μl. The (total) dwell volume of the detection channel is defined as the total volume of the channel in between the inlet port and outlet port, which thus corresponds to the total volume of a liquid dwelling in the detection channel at any given time.

In some embodiments, the length of the optical path is within the range of 0.1 mm to 20 mm, or 0.5 mm to 10 mm. The length of the optical path refers to the distance that a radiation will travel within the liquid being situated in the detection, which corresponds to the distance between the windows. As described above depending on the arrangement of the windows the lengths of the optical path can be defined by a width of the detection channel (when the detection channel is sandwiched in between the windows) or the length of a middle section in case of a Z-shaped detection channel.

In some embodiments, the optical path exhibits a dwell volume within a range of 1 μl to 200 μl, or 5 μl to 20 μl.

In some embodiments, the dwell volume of the optical path refers to the volume of the section of the detection channel, which is defined as an optical path as described herein. In the case of an embodiment with a Z-shaped detection channel as described herein, the dwell volume of the optical path corresponds to the length of the middle section, between the optical windows, multiplied by the cross-sectional area of the detection channel.

In the case of an embodiment wherein the windows are arranged laterally along the detection channel, as described herein, the dwell volume of the optical path corresponds to the width of the detection channel multiplied by the cross-sectional area of the windows.

In some embodiments, two or more electrodes are positioned along the detection channel, wherein the conductivity path is situated in between the most upstream and most downstream of the two or more electrodes. As described herein, by defining the distance between the electrodes the length of the conductivity path and thus the cell constant can be chosen.

In some embodiments, the two or more electrodes are completely drilled through, such that the sections of the detection channel are entirely formed by a surrounding surface of the respective electrodes. As described herein said embodiment is particularly beneficial when the cross-sectional dimension of the detection channel can be chosen smaller than the width of the electrodes.

In some embodiments, two or more electrodes are partially drilled through at respective end portions or laterally in a section between their end portions, such that the remaining surface of the electrodes allows for a physical contact of the passing liquid, wherein the section of the detection channel is formed partially by electrode material and partially by material of the flow cell body.

Such an embodiment is particularly beneficial for larger cross-section dimensions of a detection channel, since the size of the detection channel can be considerably larger that a width of the electrodes.

As used herein the term "electrode" refers in some embodiments to the component of the flow cell made of an electrically conducting material, which is in physical contact with a liquid passing through the detection channel and thus allows for a conductivity measurement as described herein.

In some embodiments, the electrodes are made of a conducting material, for example metals, conducting ceramics, conducting polymers, graphene. In some embodiments, the electrodes are made of bio-inert metals and metal alloys, for example stainless steel alloys, Gold and alloys thereof, Platinum and alloys thereof, Titanium and alloys thereof.

Different shapes of electrodes can be envisioned including for instance cylindrical or cuboidal shape, where the electrodes can be solid or a hollow body. In some embodiments, the electrodes exhibit an elongated shape with an aspect ratio (ratio between the cross-sectional dimension and length) of for instance 2, 3, 5 or more.

In some embodiments, the electrodes have a pin or rod-like elongated shape, such that the electrodes may be inserted a flow cell body typically made of a softer insulating material.

In some embodiments, the flow cell body is made of an electrically insulating material, for example synthetic materials, resins, ceramics. In some embodiments, the flow cell body is made of chemically stable synthetic materials, like Polyetheretherketone (PEEK), Polytetrafluoroethene (PTFE), Ethylenetetrafluoroethylene (ETFE), Chlorotrifluoroethylene (CTFE), Polyvinyl chloride (PVC), Polychlorotrifluoroethylene (PCTFE). Said materials are not only largely inert and thus typically do not interfere with the analyte and detection. Moreover, the softer materials may be particularly suited for forming a detection channel within the body, for instance by drilling. Likewise, an insertion of electrodes, e.g. in form of a rod or pin, can be easily achieved.

In some embodiments, diameters for electrodes in the shape of a rod or pin may be 0.1 mm to 10 mm, 1 mm to 5 mm, or 1.5 to 4 mm. Subsequent to the insertion into the flow cell body a detection channel including a surface that provides a physical contact for the liquid can be formed by drilling through the flow cell body and at least partially through the electrodes.

The use of such pin-like electrodes is particularly beneficial for providing also arrangements with three, four or more electrodes for instance for a leakage-current resistant 3-electrode or a polarization-resistant 4-electrode or a leakage-current and polarization-resistant 5-electrode setup.

As used herein "leakage-current" relates to currents arising between the voltage carrying electrodes of the conductivity measurement setup and other electrically conducting elements of the flow path wetted by the transported, electrically contacting liquid. Those electrically conducting elements which are not part of the originally intended conductivity measurement setup will increase the effectively conducting surface area and falsify the conductivity reading. The amount of leakage current will increase with the inner diameter of the interconnecting liquid channel (e.g. tubing and capillary ID) and will decrease with the distance between electrodes and leakage current hosting conducting elements in the flow path. For a given and fixed setup, the error can partly be compensated by a recalibration of the cell constant electrically conducting elements which is defined as the ratio of effective distance versus effectively conducting surface areas of the system. However, this situation is prone to errors caused by changes of the flow path setup (e.g. capillary or tubing ID and length), especially for the high-flow (above 100 ml/min) regime with inner tubing diameters above 1 mm. For two electrode setups the first electrode (electrode 1), which is usually located upstream of the flow path with respect to electrode 2 will hold a ground potential, so as for a properly grounded flow path no leakage current arises from or towards this grounded electrode 1. Electrode 2, which is usually located further downstream, with respect to electrode 1, usually carries an AC voltage and might therefore act as a source (or sink) of leakage currents, altering the conductivity measurement, as described before. The leakage currents of electrode 2 can be blocked by the insertion of a third, electrically grounded electrode (electrode 3) which is part of the same conductivity measurement setup, which may be inserted into the same flow cell body, which may be realized by a third and at least partially and along the detection channel drilled through press-fit pin within the same insulating flow cell body carrying electrode 1 and 2 and located further upstream of the flow path, with respect to electrode 2.

As used herein "polarization" relates to the build-up of electrochemical double layer arrangements in highly concentrated solutions of solvated charge carriers (e.g. ions) by those same on the electrode surfaces during the conductivity measurement, partly masking the voltage applied and therefore reducing the measurable current between those electrodes, falsifying the conductance and conductivity measurement. Those skilled in the art know that the strength of polarization is dependent on the current flowing between the electrodes and a four electrode setup is favorable for the realization of a polarization-resistant conductivity measurement by an essentially current-free measurement of the potential or voltage drop, between two inner electrodes, that is needed to keep a fixed current flow between an outer pair of electrodes. The conductance is calculated as the ratio of polarization-free voltage reading and value of the current.

The embodiments of a five-electrode setup provide the means to combine the benefits of a leakage-current resistant and polarization-resistant conductivity measurement. It simply consists of the four-electrode setup described before, complemented by a fifth, electrically grounded and with respect to the liquid flow path most downstream situated electrode, wherein the first electrode with respect to the liquid flow path is electrically grounded as well.

In some embodiments, the two, three, four, five or more electrodes are inserted into the flow cell body, in some embodiments as pins or rods, from the same side of the flow cell body. However, in some embodiments the electrodes are inserted from opposing sides of the flow cell body.

In one embodiment, the electrodes are press-fit pins. The term "press-fit pin" has the usual meaning in the field and relates to pins made of a conductive material that may be pressed through a printed circuit board to allow for mechanical and electrical interconnection.

Press-fit pin junction techniques typically mechanically fix a press-fit pin onto a printed circuit board by way of inserting the press-fit pin into a through-hole, whose diameter is slightly smaller than the width of the press-fit pin, of the printed circuit board, thereby ensuring a frictional force.

Commercially widely available press-fit pins have beneficial properties as electrodes. However, the electrodes may also be custom designed using e.g. appropriate CNC (computer numerical control) machining tools.

In particular, the press-fit pins exhibit typically a rod-like shape and hardness, which allows for a straightforward insertion into the typically softer material of a flow cell body.

In some embodiments, press-fit pins with a diameter in the range of 1.5 mm to 4 mm, or 3 to 3.5 mm are chosen.

Pressing the press-fit pins into the flow cell body, typical made of a soft insulator material, and subsequently at least partially drilling through said pins results in a number of advantages as partially described above. Namely, a gap-free, closed surface in the area of the material boundary between the pin and the flow cell body can be formed. Thereby, air bubbles adhering to the conductive surfaces of the pins can be avoided and do not interfere with the conductivity measurement. Moreover, the smooth surface allows for an easy cleaning of the channel and a reduced the risk of contamination.

Furthermore, the press-fit pins allow for an easy arrangement of electrodes in regard to the detection channel. For instance, the distance and diameter between the pins and thus the cell constant can be adjusted according to the desired measuring range without changing the outer contours of the flow cell.

Furthermore, the press-fit pins allow for a straightforward connection of the electrodes with a printed circuit board and thus the reading or supporting electronics.

In some embodiments, the flow cell comprises a printed circuit board.

As used herein the term "printed circuit board" or "PCB" has the meaning in the art, where at times it may also be referred to a printed wiring board (PWB), or a PC Laminate (PC Lam)). A printed circuit board typically mechanically supports and electrically connects electronic components or electrical components using conductive tracks, pads and other features etched from one or more sheet layers of copper laminated onto and/or between sheet layers of a non-conductive substrate.

A printed circuit board thus provides a mechanism for implementing a circuit design (i.e., the interconnection of electrical devices and components). A PCB may be "single layer," "double layer," or "multi-layer"— each of which refers to the number of electrically conductive layers. A multi-layer board comprises alternating layers of conductive material and electrically insulating material bonded together. As used herein, terms of the form "conductive" and "insulating" refer to the properties of electrical conduction and electrical insulation, respectively.

In order to connect signal paths from one conductive layer to another conductive layer, holes (or through-holes or through-plated holes) are drilled through a PCB and are subsequently coated, or plated, with a conductive substance (there are a variety of known techniques for through-hole-plating). These plated-through-holes are also referred to as "vias." In high-density circuit designs, the number of components—and the resulting signal paths interconnecting the components—typically require use of multi-layer boards with thousands of vias. It should be noted that there are also other types of holes drilled into a PCB, e.g., "component holes" for receiving the pins of a surface mount component.

Each through-hole typically comprises a length (which corresponds to the thickness of the PCB across all of the layers) and a diameter. In general, in order to plate the through-hole, the through-hole must have a minimum diameter that is a direct function of the thickness of the PCB, which itself is determined as a function of the design of each layer.

In some embodiments, the electrodes, which may be press-fit pins, are press fitted into through-holes of said printed circuit board.

The inventors have realized that by press-fitting the electrodes through the through-holes a printed circuit board, which for is installed at one side of the flow cell body, a number of advantages arise.

In particular, printed circuit boards may be provided in any desired design. By arranging various vias or through-holes on the PCB, any desired distances and/or arrangement for the electrodes can be provided. Also, the same PCB may be used for different flow cells and due to the provision of multiple vias a desired electrode distance, e.g. from a range of 1-35 mm can be provided.

Moreover, the insertion of the electrodes as press-fit pins through the holes of a PCB provide a particular stable and accurate position of those PCB-contacting press-fit pins. In this regard after press-fitting, the pins may also be further processed on one or both sides (e.g. CNC) in order to manufacture the mechanically sensitive pins for through-plating/press-fitting into the printed circuit board with the highest possible relative position accuracy, protect them from deformation during the press-fitting process and protect the through-plating from corrosion-prone cracks of the plated-through-hole metal layer surfaces. Any corrosive processes interfering the electrical contact between PCB contacting press-fit pin part of the electrode will falsify the conductivity measurement by adding additional electrical resistance contributions to the conductivity measurement circuit.

In the embodiment the electrodes are thus not only stably and accurately positioned within the flow cell, but inherently contacted to an electronic circuit for controlling the conductivity measurement and reading the measurement data.

No additional means for electrode contacting like soldering or screws are necessary. Instead a gas-tight (long-term corrosion resistant) contact of the electrodes is achieved by press fitting them into a through-plated hole of the PCB and allow for straight forward integration of the flow cell into the further electronics of a detector.

In some embodiments, the printed circuit board thus serves as a plug or electrical connections between the flow cell and detector (comprising e.g. further units such as a light source as well as a light detector together with further control circuitry).

The implementation of a PCB of the flow cell thus provides an easy pluggable, electronic bridge between the components of detector and the flow cell. Alternative or additional connection by cable are dispensable.

In a further embodiment, the flow cell comprises a memory onto which data is stored, wherein the data is selected from the group consisting of operating parameters (for example a maximal flow rate and/or operating pressure), calibration data (for example a cell constant for conductivity calculation or temperature sensor calibration data), good lab practice (GLP) data (for example a serial number, an article number, a date of manufacturing, an optical path length, an error code, a last service date, or data on the optical transmission properties) and/or process history data (e.g. working hours, system peak pressure, eluent peak temperature).

In some embodiments, the memory is mounted on the printed circuit board. For instance, the memory may be a memory with permanent memory capacity such as an Electrically Erasable Programmable Read-Only Memory (EEPROM).

Providing a memory, such as on the PCB, and saving the data has a number of advantages when implementing the flow cell into a detector of a liquid chromatography system.

In typical liquid chromatography system flow cells are frequently exchanged to allow for an optimal choice of flow cell parameters (e.g. optical path length, dwell volume) for the respective experimental conditions. Using conventional flow cells after each exchange a recalibration has to be performed to ensure specifications and data integrity. While the recalibration of the optical parameters (e.g. photo sensor integration time) is fast and automated for most detectors, the recalibration of the conductivity cell constant is a manual and more time-consuming process. Some state of the art detectors rarely provide the opportunity for the user to change the conductivity flow cell themselves but rather the change of a whole detector module. By providing the opportunity to save calibration data on the flow cell a recalibration of the cell constant is not necessary. Instead after an exchange upon starting a system the detector may read the individual calibration data for each flow cell and an exchange is easily possible (e.g. in the case of an adaption of the flow rate range).

Thus, important parameters such as the cell constant may only be determined once and may be reused for following measurements.

Also, other valuable information such as an error code or the last service date can be provided to ensure that the system reacts appropriately and for instance returns a warning in case in a previous experiment an error occurred for said particular flow cell.

Furthermore, a process memory for parameters either provided by the detector itself (e.g. peak temperature) or the chromatographic system (e.g. peak pressure and according flowrate) give insight into causes of damage to the flow cell (e.g. leakage due to excess temperature or pressure)

Another beneficial aspect is the assurance of chromatographic data integrity. Since the system can recognize and therefore record the flow cell type used for a particular data trace or measurement, it is difficult to accidently or deliberately falsify absorbance or conductivity data.

The integration of a printed circuit with a memory thus does not only provide for a straight forward integration of the electrodes, but also for a number of further functions that may improve upon the overall system performance.

In a further embodiment, the flow cell comprises one or more temperature sensors for determining the temperature of the liquid passing in the detection channel.

It is known in the art that the interpretation of conductivity measurement may depend on a precise knowledge of the temperature of the eluent, since the availability of solvated charge carriers (e.g. ions) contributing to the conductivity of a liquid is directly dependent on the dissociation equilibrium of those charge carriers (e.g. salts which are electrically neutral in an undissociated state) which itself is highly temperature dependent. Therefore, a reported conductivity usually refers to a reference temperature (e.g. 20° C.). If the conductivity of a liquid is measured at temperatures different to the reference temperature, it may be necessary to conduct a corrective calculation of the theoretically expected conductivity of the liquid at the reference. To this end however a knowledge of the exact temperature of the liquid, on which a conductivity measurement is conducted, is required.

A "temperature sensor" refers in some embodiments an electrical or electronic component which generates an electrical signal depending on the temperature at the sensor. In the state of the art a multitude of temperature sensors are known such as semiconductor temperature sensors, resistance temperature sensors, pyroelectric materials, thermocouples or oscillating quartz crystals.

The temperature sensor may be in direct contact with the liquid passing in the detection channel, and may be in close proximity to the electrodes to allow for a precise estimation of the temperature of the liquid in conductivity path.

In some embodiments, the temperature sensors is mounted onto the printed circuit board. The temperature sensor may be a surface mounted device or SMD, which is commercially available and for instance represent IC's already calibrated by the manufacturer with digital output, which are soldered directly on the printed circuit boards.

In some embodiments, no further temperature sensor has to be placed on or in the detection channel, as such a separate contacting, mounting or sealing is not necessary. Moreover, for an embodiment in which the temperature sensor is mounted onto the PCB, it is not necessary to use separate measuring electronics (amplifier, AD conversion) as may be the case for example with thermistors, RTD's or thermocouples.

In a particular embodiment, the flow cell comprises two temperature sensors for determining the temperature of the liquid using a differential temperature measurement, wherein both temperature sensors may be mounted onto the printed circuit board.

The first temperature sensor may be thermally in contact with one of the electrodes and thus with the eluent contacting the electrode. To this end the temperature sensor may be connected with a heat conducting paste or a thermally conducting gap filler material with said electrode. The first temperature sensor does not only measure the temperature of the eluent, but also the temperature of the surrounding flow cell (e.g. the flow cell body and the PCB (if mounted thereon)). The temperature of those components may be influenced by the electronic components, the light sources or simply the ambient air. Even though the first temperature sensor is in thermal contact with the electrode (and thus the eluent) the temperature reading will to a significant extent reflect temperature variations of other components (flow cell body etc.).

The effect can be corrected for by means of a second temperature sensor.

To this end the second sensor is thermally connected to the flow cell, but not to any one of the electrodes. Thus the second temperature sensor is not in contact with the eluent (thermally insulated towards the eluent by the flow cell body material). The reading of the second temperature sensor therefore reports on those variables that disturb the measurement of the eluent temperature using only the first sensor. Instead the signal from the second temperature sensor reflects the temperature variation of flow cell body, PCB or other components of the flow cell, but importantly not (or to a neglible extent) the temperature of the eluent.

Therefore, by using the signal of both temperature sensors in a differential temperature measurement, the eluent temperature can be determined with very high precision.

To this end it, a calibration experiment may be conducted using a third temperature sensor, which may be brought directly into the liquid passing in the detection channel to determine the temperature of the exemplary eluent as accurately as possible.

The temperature difference between the first temperature sensor and the second temperature sensor exhibits a linear relationship to a difference between the first and the external third temperature sensor. Using such a simple calibration measurement, the correct eluent temperature can be calculated based upon such a simple calibration.

For instance, during calibration, the differences between the first and second temperature sensor as well as the difference between the first and a third (external) temperature sensor are determined as described for at least two different eluent temperatures. From such a calibration measurement the coefficients of the linear relationship between both sensor pair differences can be determined.

The calibration data and/or the coefficients of the linear relationship may be stored on a memory of the flow cell, e.g. on an EEPROM. This ensures that upon installing and/or changing a flow cell, the calibration data for a precise temperature determination can be provided for each individual flow cell without any further necessary steps.

Using the described embodiment of a first and second temperature sensor in a differential measurement allows measurement of the eluent temperature accurately to within $+/-1°$ C. or even less. Importantly, both temperature sensors can be mounted on the PCB and do not have to protrude into the detection channel. This not only simplifies the installation of the temperature sensor, but also ensures that the liquid flow is not disturbed, thus effectively avoiding turbulences or an increased back pressure.

In a further embodiment, the disclosure relates to a detector for a liquid chromatography system comprising a flow cell as described herein.

As used herein the term "detector for a liquid chromatography system" refers to a device in a liquid chromatography system that allows for an absorption measurement and conductivity measurement as described herein. The means for performing said measurements may be combined in a single housing or separate housing.

Detectors for a liquid chromatography system for either one of the measurements are well known in the art and commercially distributed.

For instance, the AZURA UVD 2.1S by the Knauer GmbH is an example of a single variable wavelength UV absorption detector for HPLC. Other examples of detectors exist for different schemes of absorption measurements in a liquid chromatography system using for instance photodiode array detector (PDAs) or a fixed wavelength as described herein or known in the art (see e.g. M. Schwartz: HPLC Detectors: A Brief Review, Journal of Liquid Chromatography & Related Technologies, 33:1130-1150, 2010 and references cited therein)

Furthermore, the AZURA Conductivity Monitor CM 2.1S by the Knauer GmbH constitutes an example of a standalone detector for a liquid chromatography system for monitoring conductivity Other examples of detectors exist for different schemes of conductivity measurements as described herein or known in the art (see also e.g. M. Schwartz: HPLC Detectors: A Brief Review, Journal of Liquid Chromatography & Related Technologies, 33:1130-1150, 2010 and references cited therein)

In some embodiments, the detector thus comprises at least a light source and a light detector for performing an absorption measurement as well as electronic components for performing a conductivity measurement and optionally a temperature measurement.

For instance, for a conductivity measuring system the detector may comprise a voltage source, such as an alternating Voltage source (AC source). The AC source may be connected, directly or indirectly, to the electrodes, so as to complete a circuit. The AC source may be capable of operating at one or more than one frequency. The presence of the two conductive electrodes separated by an insulating material, i.e. the flow cell body, allows a conductivity measurement to be performed when a liquid passes the detection channel and the electrodes are connected to a voltage source to drive a current. In this case the liquid completes the circuit between the electrodes along the conductivity path, and the current through the circuit changes depending on the electrical conductivity of the liquid, which may reflect on the concentration of proteins or other analytes of interest within the eluent.

A person skilled in the art understands that means for a conductivity measurement may include further means or electronic components such as an AC voltage source with fixed or variable AC frequency, amplifier, RMS to DC converter and analog-to-digital converter.

In some embodiments, the detector as described herein comprises a light source generating a light beam and a light detector, wherein the flow cell is arranged such that the light beam aligns with said optical path and the detection channel is arranged in between the light source and the light detector.

The flow cell is thus installed within the detector to allow light from one or more suitable light sources to pass through a first window, such that it travels through the detection channel along the optical path and the liquid towards the second window after which it is detected by photodetector.

By measuring the changes of intensity of the light travelling through the eluent, the absorbance can be measured. When the eluent includes light absorbing analytes (e.g. proteins with light absorbing amino acids), the absorbance will be higher for a higher concentration of proteins. In some embodiments, a further reference photo detector may be included and positioned for measuring light of the light source that does not travel through the liquid. To this end, a half-mirror may be installed in the optical path in between the light source and the entry window of the flow cell, which directs part of the light beam on to a reference detector. As such, variations in the light intensity of the light source may be taken into account.

One or more light sources can be used. The light source(s) can be located in the housing of the detector or can be located outside of the housing. For guiding of the light beam, one or more additional optical elements can be included such as a lens or fiber optical elements.

The light source(s) shall be capable of generating light at a wavelength that is suitable for the analytes to be detected in the eluent.

Typically, the light is in the UV or visible range (UV/VIS). For some applications, the light may be infrared light.

In some embodiments, the light source covers the UV-, visible and optionally the IR-range.

Where fluorescence is also being measured, at least one light source must be capable of generating light that stimulates fluorescence in the substance to be detected.

Suitable light sources are known in the art. Examples of light sources include, but are not limited to, lasers or light emitting diodes (LEDs), such as TOPLEDs (OSRAM Opto Semiconductor), UVTOPR) (Sensor Electronic Technologies), or Nichia UV-LEDs (Nichia Corporation, Tokushima, Japan) some of which provide monochromatic light, or nearly monochromatic light, and deuterium, Xenon, mercury, Zinc, and tungsten lamps, which provide broader spectrum light output.

Where the light is monochromatic light, or nearly monochromatic light, and is of a desired wavelength for the analysis, there is no need to separate or filter the light using a prism, holographic grating or bandpass filter and direct light of a desired wavelength through the optical flow cell body. On the other hand, where the light is not monochromatic, it may be desirable to use a prism or grating or filter to select the desired wavelength or range of wavelengths of light and direct the resulting light through the flow cell body.

When a prism, grating or filter is used, the transmitted wavelength can be varied, depending on the analyte of interest being eluted from a column and through the flow cell system. For example, light at a wavelength of 280 nm is absorbed by most amino acids and may be used for measuring protein concentration, and 260 nm may be used for measuring DNA concentration (see, for example, Sambrook and Russell Mar. 17, 2016 (2001). Molecular Cloning: A Laboratory Manual (3rd ed.). Cold Spring Harbor Laboratory Press. ISBN 978-0-87969 577-4).

In some embodiments, the detector is configured for single or fixed wavelength detection scheme and comprises one or more monochromatic light sources for said fixed wavelengths. Historically, fixed wavelength detectors use the 254 nm output from a low pressure mercury lamp. However also, one or more monochromatic light emitting diodes may be used. The detector may be configured such that the nearly monochromatic light travels along the optical path such that a detection of analyte absorbance at said fixed wavelength can be fast and efficiently monitored.

In a further embodiment, the detector is configured for a variable wavelength detection scheme and comprises optical means for selecting a wavelength for the light beam entering the flow cell. For instance, the detector may comprise a light source with a broader wavelength emission spectrum such as a tungsten lamp (approx. 380 nm to 900 nm) or deuterium lamp (190 nm and 380 nm) as well as a dispersion element, such as a grating or a prism, to specifically guide light of a desired wavelength into the flow cell and onto a photo detector. For instance, the light source may be directed through a slit to a rotatable diffraction grating that spreads the light out into its constituent wavelengths. The grating is then rotated to direct a single wavelength of light through a slit, through windows of the flow cell on to a photodiode.

Variable wavelength detectors can be tuned to operate at the absorbance maximum of an analyte or at a wavelength that provides more selectivity. They can also be programmed to change wavelengths during a chromatographic run to compensate for response of different analytes.

In a further embodiment, the detector comprises a photodiode array detector (PDA) and optical means for dispersing the light beam exiting the flow cell onto the photodiode array detector (PDA). In this alternative detection scheme for an absorption measurement, a light beam with a broader emission spectrum, for instance stemming from a tungsten lamp or a deuterium lamp, is introduced into the flow cell and the optical path. In order to allow for a wavelength specific estimation of the absorbance, the transmitted light is dispersed using a dispersion element, such as a grating or a prism, onto a photodiode array detector (PDA).

In some embodiments, photodiode array (PDA) refers to a linear array of discrete photodiodes, for example on an integrated circuit (IC) chip. Each discrete photodiode corresponds to a certain wavelength. The PDA allows monitoring the simultaneous absorbance at multiple wavelengths and may therefore be particularly suited for characterizing the concentration of multiple analytes in an eluent that exhibits analytes with different absorption characteristics.

PDAs thus extend the utility of absorption measurements by providing spectra of eluting peaks that can be used to aid in peak identification, and to monitor for co-elutions (peak homogeneity or purity), helpful during method development. They can also serve as a multi-wavelength detector. The spectra collected at the chromatographic peak apex can be used to create a library that can in turn be used to compare subsequent spectra for identification purposes, and spectra collected across the peak at each data point can be compared to evaluate peak homogeneity or purity.

In a further embodiment, the flow cell is positioned within said detector such that the outlet is arranged essentially vertically above the inlet.

The essential vertical position of the ports means, in some embodiments, that when the detector is positioned for its usual use in a liquid chromatography system upright on a horizontal plane, the outlet port is positioned above the inlet port, wherein a line connecting the inlet and outlet port is essentially vertically, i.e. oriented along the gravitational force.

Terms such as essentially, approximately, approx., etc. describe a tolerance range of less than ±20%, less than ±10%, less than ±5%, or less than ±1%.

Said connecting line may thus deviate by a tolerance range from an exact vertical orientation, such that also an almost vertical orientation of e.g. 75° or 105° shall be encompassed.

Due to the essentially vertical orientation of the inlet and outlet ports and thus the detection channel connecting said ports, natural buoyancy of potential bubbles in the duct lead to an effective expelling of said bubbles, thereby diminishing any potential disturbance with the absorption or conductivity measurements.

However, while this embodiment improves upon measurement accuracy and sensitivity of the detector, further constraints of the overall (detector) system may lead to different orientations.

In an alternative embodiment the flow cell is positioned within said detector such the outlet port is arranged essentially vertically below the inlet.

In an alternative embodiment the flow cell is positioned within said detector such the outlet port is arranged essentially horizontally with respect to the inlet port.

In certain cases, these alternative configurations may be desirable for the implementation of the flow cell into (and out of) the detectors and their connection to the remaining components of liquid chromatography system.

In a further embodiment, the flow cell is mounted within the detector on a mounting plate that may be rotatable such that the orientation of the inlet port with respect to the outlet port may be altered, e.g. between an essentially vertical and/or essentially horizontal orientation as described herein.

In a further embodiment, the flow cell is connected to the light sources of the detector by means of light transferring optical fibres thus allowing for a spatial separation between both entities. The light transferred into the flow cell and traveling along its optical path may be detected by a photosensitive detector-sub-unit which may be mounted in direct spatial vicinity of the light exit of the flow optical path cell thus providing a light-tight connection between both entities. The detector sub-unit comprises the photosensitive element (e.g. photodiode or diode array IC) and supporting electronics as well as supporting electronics for the conductivity and temperature measurement performed via the flow cell hosted conductivity electrodes and temperature sensors. The detector sub-unit further may carry electronic means for permanent memory (e.g. for a separate firmware, measurement parameters and GLP data) and a separate processor for the control of surrounding electronic components, AD-conversion of analogue measurement signals and digital data processing. The detection sub-unit encompasses means for a reversible electrical connection between flow cell PCB (contacting the conductivity electrodes and carrying further electronical components such as memory IC's or temperature sensors) and detector sub-unit PCB (e.g. via sockets, plugs or spring contacts). The electrical connection between detector and detector-sub-unit provide for various supply voltages, digital communication and clock signals and can be realized by means of a shielded multiwire signal. The described arrangement is especially useful for combined absorbance and conductivity measurements in a high flow rate range above 200 ml/min for which typically tubing material with outer diameters greater than 3 to 4 mm as well as according bending radii of 250 mm and above are utilized, requiring for a spatially flexible arrangement of involved components, provided via the remote arrangement of flow cell and photo-sensitive detector sub-unit. Entities such as the light sources of the detector and the flow cell or the detector-sub-unit may be integrated into a single housing or separate housings.

In a further embodiment, the detector comprises further supporting electronics and/or a processor. The term processor shall encompass any device known in the art for processing data (in particular measurement data) and may include processor chip, a microprocessor or a microcontroller.

The processor and/or further supporting electronics may be configured for controlling components of the measurement system such reading of measurement data for instance from the electrodes or photodetectors, as well as for controlling the light source and/or voltage source for the respective absorption and/or conductivity measurements.

In some embodiments, an electrical connection of the detectors (and its processor) with the flow cell may be established to the flow cell (and e.g. the electrodes) via a PCB as described herein.

Moreover, the PCB may also act as a bridge for connecting the different components of the detector (e.g. light source or voltage source as well as the detectors) within each other and the processor, such that only upon insertion of the flow cell a ready-to-operate detector may be provided.

In a further embodiments, the detector comprises a processor which is configured to read from a memory of the flow cell, such as from a memory mounted on a PCB, wherein the data comprise operating parameters (for example a maximal flow rate and/or operating pressure), calibration data (for example a cell constant for conductivity calculation and/or temperature sensor calibration data) and/or GLP data (for example a serial number, an article number, a date of manufacturing, an optical path length, an error code, a last service date, or data on the optical transmission properties).

By accessing said data the processor may thus gain information on important operating parameters of the flow cell. For instance, the maximal flow rate may be controlled to avoid exceeding the defined limit. Furthermore, the cell constant as previously calibrated may be read to allow for precise interpretation of the conductivity or error may be taken into account to react appropriately.

In a further embodiment, the detector is configured to determine whether the flow cell is present.

The presence of the flow cell can be for instance determined by detecting the presence or absence of a connection to the PCB. Since the PCB may act as an electrical bridge for interconnecting electrical components of the detector (such as a processor with further units) the absence of said connection reports on an absence of the flow cell. However, alternative means are possible such as the use of an RFID chip or a characteristic electrical resistor for allowing the detector to recognize automatically whether a flow cell is present.

In a further embodiment, the detector comprises a light source and is configured to block the light pathway of said light source (e.g. by means of shutter) and/or the driving current of said light source in case it is determined that a flow cell is not present. Such a feature may augment the safety of the device and can be particularly valuable when working with a light source in the hazardous wavelength regime (e.g. UV light).

In a further embodiment, the detector is configured to determine whether the flow cell is present and which type of the flow cell is present.

For instance, in the case of a flow having a memory, such an EEPROM on a PCB, the serial number and/or type of flow cell may be stored, such that upon initiation of the detector the processor may read the type of flow cell in order to verify that a proper type is installed and/or adjust system parameters accordingly.

In a further aspect the disclosure also relates to a liquid chromatography system comprising a flow cell as described herein or a detector as described herein.

In some embodiments, a "liquid chromatography system" means a system as known in the art and described herein suitable for performing liquid chromatography. A liquid chromatography system is intended in its broad sense to include all apparatuses used in connection with liquid chromatography, whether made of only a few simple components or made of numerous, sophisticated components which are computer controlled or the like.

A typical liquid chromatography system includes a solvent reservoir, a pump, a sample injector, columns and one or more detectors as well as optionally additional data collection or processing devices as well as one or more valves for solvent selection, sample injection, column selection or fractioning.

The solvent reservoir holds the components of the mobile phase, typically comprising a mixture of polar and non-polar liquids depending on the sample to be analysed. A column holds packing material (stationary phase) which active component is referred to as absorbents. A sample injector injects the sample into the mobile phase, which by means of the pump forces the liquid to pass through the column. Each component (e.g., analyte such as a protein, DNA etc.) in the liquid interacts slightly differently with the adsorbent material of the column, thus retarding the flow of the analytes. If the interaction is weak, the analytes flows off the column in a short amount of time, and if the interaction is strong, then the analytes take a longer time to flow off the column. The time at which a particular analyte elutes (rises up out of the column) is called retention time. The retention time measured under specific conditions is a distinguishing feature for a given analyte.

Various sorts of columns are available, loaded with adsorbents varying in molecule size, and in the nature of their surface science. The utilization of small molecule size packing materials requires the utilization of higher operational pressure ("backpressure") and regularly enhances chromatographic resolution (i.e. the degree of division between sequential analytes rising up out of the column). Sorbent particles might be hydrophobic or polar in nature. Basic mobile phases incorporate miscible mixture of water with different natural solvent, for instance acetonitrile and methanol.

Today, most liquid chromatography systems include pumps which can generate relatively high pressures of up to around 6,000 psi. In many situations, an operator can obtain successful results by operating an LC system at "low" pressures of anywhere from just a few psi or so up to 1,000 psi or so. More often than not, however, an operator will find it desirable to operate an LC system at relatively "higher" pressures of over 1,000 psi. The operation and use of liquid chromatography systems at such "higher" pressure levels is often referred to as "high pressure liquid chromatography" or "high performance liquid chromatography" (HPLC).

The detector of liquid chromatography system allows for an analysis of the eluent in regard to the presence and/or concentration of analytes. The typical liquid chromatography system includes at least a detector as described herein allowing for an absorption measurement and conductivity measurement using a single flow cell. However, the system may also include further detectors such as electrochemical detectors, mass-sensitive detectors, corona-discharge detectors, stray-light detectors, radioactivity detectors, electrochemical detectors, chiral detectors, fluorescence detectors, refractive index detector etc.

In a further aspect the disclosure relates to a use of a flow cell, a detector or a liquid chromatography system as described herein for liquid chromatography, such as for high performance liquid chromatography (HPLC) or fast protein liquid chromatography (FPLC).

Technical features that have been disclosed for the flow cell as described herein also apply for the detector, the liquid chromatography system, as well as uses thereof. A person skilled in the art recognizes that certain features of the flow cell as described herein can be employed in the context of a flow cell as described herein also apply for the detector, the liquid chromatography system and/or uses thereof and convey the same beneficial effects.

It should be understood that various alternatives to the embodiments described herein may be employed. It is intended that the claims of the invention define the scope of the invention and that the method and apparatus within the scope of these claims and their equivalents be covered thereby.

Without intending to be limiting, the disclosure will be explained in more detail with reference to exemplary embodiments and the figures.

FIG. 1 illustrates one embodiment of a flow cell 1 allowing for an absorption and conductivity measurement. The flow cell 1 comprises a flow cell body 3, an inlet port 7, an outlet port 5 and a detection channel 13 formed within said flow cell body 3 fluidly connecting said inlet and outlet ports. The eluent enters the flow cell 1 at the inlet port 7 and exits the flow cell 1 at the outlet port 5. In between the ports, the absorption characteristics and conductivity of the eluent are analyzed in respective sections of the detection channel 13.

To this end the flow cell 1 comprises two windows 11 that are transparent to light (such as UV, VIS and optionally IR) and are situated on lateral sides and in direct contact with the detection channel 13, such that a beam of light may enter a first window 11 on one side, traverse the liquid within the detection channel 13 and exit the second window 11 on the opposite side to be guided onto a photodetector. An analysis of the absorption characteristic of the passing liquid allows for a determination of the presence and/or concentration of analytes in the eluent as described herein. In the illustrated embodiment the optical path 15 is oriented perpendicular to the liquid flow and exhibits a width which corresponds to the diameter of the detection channel 13.

To allow for a conductivity measurement the flow cell 1 further comprises two electrodes 9, 10, wherein a conductivity path 17 is formed by at least partially drilling through said electrodes 9, 10 forming a remaining surface 25 to allow for physical contact of a liquid passing through the detection channel 13. In the depicted embodiment the electrodes 9, 10 are pins of conductive material that are completely drilled through so that sections of the detection channel 13 are completely formed by a surrounding surface of the electrodes 9, 10 and provide a complete wetting of the electrode surface by the passing liquid.

The ends of the conductivity path 17 are defined by said sections in which the liquid passing through is in physical contact with the electrodes 9, 10. The lengths of the conductivity path 17 and thus the cell constant may be controlled by the distance between the upstream electrode 10 and the downstream electrode 9.

Providing a conductivity path 17 by drilling through said electrodes 9, 10 results in a reproducible smooth and closed surface along the border of the detection channel 13 between insulating material (stemming from the flow cell body 3) and conducting material (stemming from the electrodes 9, 10). As detailed above, such an incorporation conveys a number of benefits over prior art approaches including the avoidance of turbulences, a decreased backpressure, precise control of the cell constant as well as a simplified cleaning and thus a diminished risk of cross-contamination.

The flow cell 1 further comprises a PCB 21 which is mounted onto a side of the flow cell body 3. In this embodiment the electrodes 9 and 10 are press fitted into through-holes 19 of said printed circuit board 21. The insertion of the electrodes 9, 10 as press-fit pins through the holes 19 of the PCB 21 provide a particular stable and accurate positioning and provided an inherent contact for controlling the conductivity measurement and reading the measurement data.

In some embodiments, the printed circuit board 21 comprises a memory (not shown) that allows for storing of operating parameters and history thereof, calibration data or other data such as the type of the flow cell.

Figure 2:
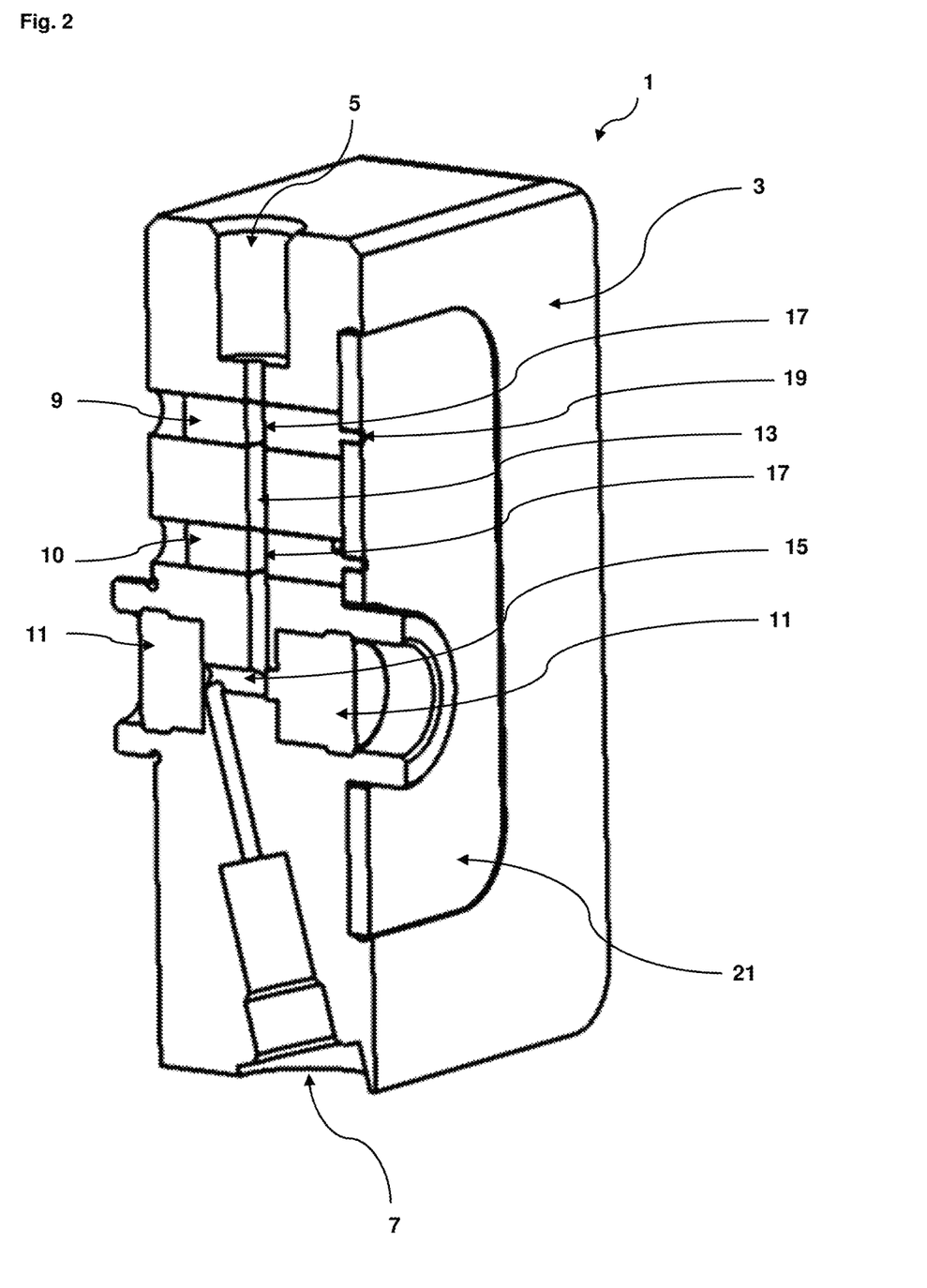
FIG. 2 is a schematic illustration of a further embodiment of a flow cell allowing for an absorption and conductivity measurement.

FIG. 2 illustrates a further embodiment of a flow cell 1 allowing for an absorption and conductivity measurement. Analogous to the embodiment depicted in FIG. 1 the flow cell comprises a flow cell body 3, an inlet port 7, an outlet port 5, two windows 11 situated on opposing sides of the flow cell body 3, which are transparent to light, as well as two electrodes 9, 10 configured for a conductivity measurement. Furthermore, the flow cell 1 comprises a detection channel 13 formed within said flow cell body 3 fluidly connecting the inlet 7 and outlet port 5. The detection channel comprises an optical path 15 situated in between said two windows 11 such that a light absorption measurement may be performed for a liquid passing through the detection channel 13. Furthermore, the detection channel 13 comprises a conductivity path 17 formed by drilling through the electrodes 9 and 10 to allow for a physical contact of a liquid passing through the detection channel 13. The functions and principles of the components are similar to for the embodiment depicted in FIG. 1 and described above. In particular, e.g. the flow cell 1 comprises a PCB 21 into which the electrodes 9 and 10 are press fitted.

The embodiment depicted in FIG. 2 differs however from to FIG. 1 in regard to the shape of the detection channel 13. While in FIG. 1 the detection channel 13 takes the form of a straight line, in the embodiment of FIG. 2 the detection channel 13 exhibits a Z-shape, i.e. the detection channel 13 comprises three rectilinear sections, an upstream, a middle and a downstream sections, wherein the middle section is oriented with an angle of roughly 75° with respect to the upstream section and 90° with respect to the downstream section.

Such a bended Z-shape allows the placing of two windows 11 at the respective ends of the middle section, such that the length of the middle section defines the length of the optical path 15. The embodiment provides an enhanced flexibility for the length of the optical path length, while maintaining a compact design of the flow cell 1.

Figure 3:
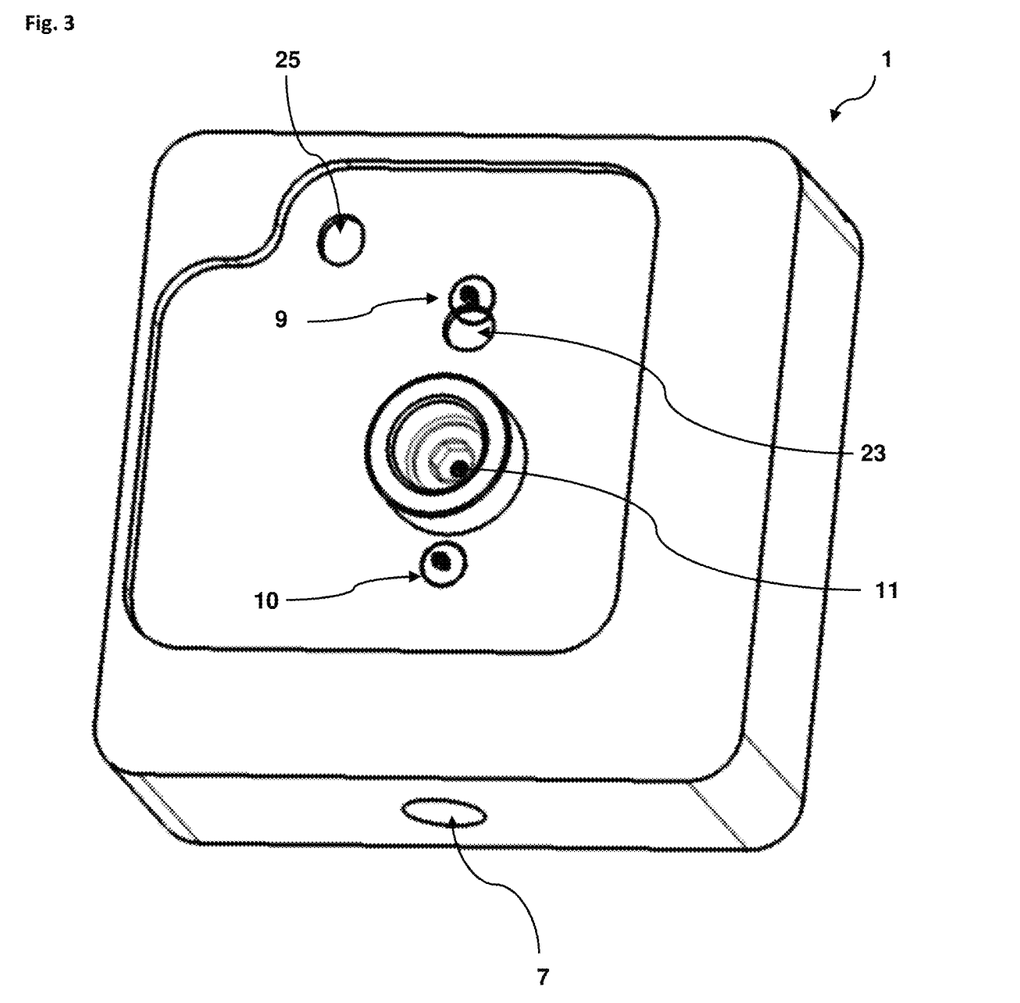
FIG. 3 is a schematic representation of the embodiment of a flow cell of FIG. 1 with a removed printed circuit board to illustrate the positioning of temperature sensors for a differential measurement.

FIG. 3 is a schematic representation of the flow cell 1 of FIG. 1 to illustrate the positioning of temperature sensors for a differential measurement. To this end the flow cell 1 is depicted without the printed circuit board to illustrate the pockets for receiving the respective temperature sensors. It is noted that in FIG. 3 the temperature sensors themselves, which are mounted on the PCB, or thermoconducting material are not shown.

However, as visible in FIG. 3 the pocket 23 for a first temperature sensor is positioned so that the temperature sensor may contact electrode 9 and thus report on the temperature of the passing eluent. However, the reading of first temperature sensor will be influenced by temperature variations of the cell body, PCB or other components.

To account for these influences, pocket 25 for the second temperature sensor is positioned in contact with the flow cell body 3 or PCB (not shown), but not in contact with any one of the electrodes 9 or 10 and does not report on the eluent temperature. The second temperature sensor thus allows monitoring of those variations or deviations that may impede accuracy of a direct measurement of the eluent temperature based upon the first temperature sensor alone.

As detailed above, using a simple calibration scheme the temperature reading of both sensors can be exploited to precisely determine the eluent temperature with minimal interference with the liquid flow.

What is claimed is:
1. A flow cell for a detector in a liquid chromatography system, the flow cell comprising:
  a monolithic flow cell body formed of a non-conductive material;
  an inlet port;
  an outlet port;

at least two windows situated on opposing sides of the monolithic flow cell body, the at least two windows being transparent to light; and at least two electrodes formed of a conductive material disposed within the monolithic flow cell body and configured for a conductivity measurement, wherein the flow cell comprises a detection channel formed within said monolithic flow cell body, the detection channel fluidly connecting said inlet and outlet ports, the detection channel comprising:

an optical path situated in between the at least two windows such that a light absorption measurement may be performed for a liquid flowing through the detection channel, and a conductivity path situated in between said at least two electrodes to allow for a physical contact of the liquid flowing through the detection channel;

wherein the flow cell further comprises a smooth surface along a border of the detection channel between the non-conductive material of the monolithic flow cell body and the conductive material of the at least two electrodes, wherein the smooth surface is formed by at least partially drilling through the monolithic flow cell body and the at least two electrodes, while the at least two electrodes are inserted into the monolithic flow cell body, such that the non-conductive material of the monolithic flow cell body and the conductive material of the at least two electrodes lie along a same arc.

2. The flow cell according to claim 1, wherein the detection channel exhibits a rectilinear section connecting the inlet and outlet ports.

3. The flow cell according to claim 1, wherein the detection channel at least partially exhibits a Z-shape with three rectilinear sections, the three rectilinear sections including an upstream section, a middle section and a downstream section, wherein the middle section is oriented with an angle in the range of 30° and 90° with respect to each of the upstream and downstream sections and wherein the at least two windows are situated on opposing ends of the middle section forming the optical path.

4. The flow cell according to claim 1, wherein the detection channel exhibits a path length in the range of 10 mm to 100 mm.

5. The flow cell according to claim 1, wherein the optical path exhibits a dwell volume in the range of 1 µl to 200 µl.

6. The flow cell according to claim 1, wherein the length of the optical path is in the range of 0.1 mm to 20 mm.

7. The flow cell according to claim 1, wherein the at least two electrodes are positioned along the detection channel, wherein the conductivity path is situated in between a most distant two electrodes of the at least two electrodes.

8. The flow cell according to claim 1, wherein the at least two electrodes are completely drilled through, such that sections of the detection channel are entirely formed by a surrounding surface of the respective at least two electrodes.

9. The flow cell according to claim 1, wherein the at least two electrodes are partially drilled through at respective end portions or laterally in a section between their end portions, such that a remaining surface of the at least two electrodes allows for the physical contact of the liquid flowing through the detection channel, wherein a section of the detection channel is formed partially by the conductive material of the at least two electrodes and partially by the non-conductive material of the monolithic flow cell body.

10. The flow cell according to claim 1, wherein the at least two electrodes are press fit pins, with a diameter in the range of 0.1 mm to 10 mm.

11. The flow cell according to claim 1, further comprising a printed circuit board, wherein the at least two electrodes are press fitted into through-plated holes of said printed circuit board.

12. The flow cell according to claim 1, further comprising a printed circuit board, wherein at least a memory with a permanent memory capacity is mounted onto the printed circuit board.

13. The flow cell according to claim 1, further comprising a memory onto which data is stored, wherein the data is selected from the group consisting of operating parameters, calibration data, GLP data and process history data.

14. The flow cell according to claim 1, further comprising one or more temperature sensors configured to determine a temperature of the liquid flowing in the detection channel.

15. The flow cell according to claim 14, wherein the one or more temperature sensors comprises two temperature sensors allowing for differential temperature measurement.

16. A detector for a liquid chromatography system, the detector comprising a flow cell according to claim 1.

17. The detector according to claim 16, further comprising a light source configured to generate a light beam and a light detector, wherein the flow cell is arranged such that the light beam aligns with said optical path and the detection channel is arranged in between the light source and the light detector.

18. The detector according to claim 16, wherein:
the detector is configured for a fixed wavelength detection scheme and comprises one or more monochromatic light sources,
the detector is configured for a variable wavelength detection scheme and comprises optical means for selecting a wavelength for the light beam entering the flow cell, or
the detector comprises a photodiode array detector (PDA) and optical means for dispersing the light beam exiting the flow cell onto the photodiode array detector (PDA).

19. The detector according to claim 16, wherein the detector comprises a processor configured for reading of data from a memory of the flow cell, wherein the data comprise operating parameters, calibration data and/or GLP data.

20. The detector according to claim 16, in combination with a liquid chromatography system.

21. The flow cell according to claim 1, in combination with a liquid chromatography system.

* * * * *